United States Patent [19]

Tabei et al.

[11] Patent Number: 4,899,910
[45] Date of Patent: Feb. 13, 1990

[54] SEALANT INJECTOR

[75] Inventors: Kazuhiko Tabei, Ashikaga; Sadao Saito; Shunichi Kai, both of Kitamoto, all of Japan

[73] Assignee: Mitsubishi Kinzoku Kabushiki Kaisha, Tokyo, Japan

[21] Appl. No.: 323,972

[22] Filed: Mar. 15, 1989

[51] Int. Cl.$^4$ .............................. F03G 7/06; F24J 1/00
[52] U.S. Cl. ........................................ 222/54; 60/527; 126/263; 219/230; 219/421; 222/146.2; 222/146.5; 222/336; 222/386
[58] Field of Search .................... 222/54, 146.1, 146.2, 222/146.5, 326, 327, 386, 504, 336; 219/230, 421, 50; 60/527–529; 126/263; 148/402; 337/140

[56] References Cited

U.S. PATENT DOCUMENTS

| | | | |
|---|---|---|---|
| 3,285,470 | 11/1966 | Frei et al. ............................ | 222/54 |
| 3,734,348 | 5/1973 | White .................................. | 222/54 X |
| 3,970,068 | 7/1976 | Sato .................................... | 126/263 |
| 4,002,235 | 1/1977 | Donnelly ........................... | 126/263 X |
| 4,018,547 | 4/1977 | Rogen ................................. | 417/321 |
| 4,524,343 | 6/1985 | Morgan et al. .................... | 60/527 X |
| 4,559,512 | 12/1985 | Yaeger et al. ...................... | 60/527 X |
| 4,741,324 | 5/1988 | Ina et al. ............................. | 126/263 |
| 4,811,564 | 3/1989 | Palmer ................................ | 60/527 |
| 4,819,612 | 4/1989 | Okamoto et al. ................... | 126/263 |

Primary Examiner—Kevin P. Shaver
Attorney, Agent, or Firm—Cushman, Darby & Cushman

[57] ABSTRACT

A sealant injector for use in repair is provided with a sealant nozzle formed in a forward end of an injector body. A piston is slidably fitted in the injector body, and cooperates with the forward end of the injector body to define therebetween a sealant chamber capable of being filled with sealant. A coil spring is arranged within the injector body, and is provided with such a shape memory effect that when heated, the coil spring biases the piston toward the forward end of the injector body to inject the sealant through the sealant nozzle. A heating unit is associated with the injector body, for heating the coil spring.

10 Claims, 3 Drawing Sheets

FIG.1 FIG.2
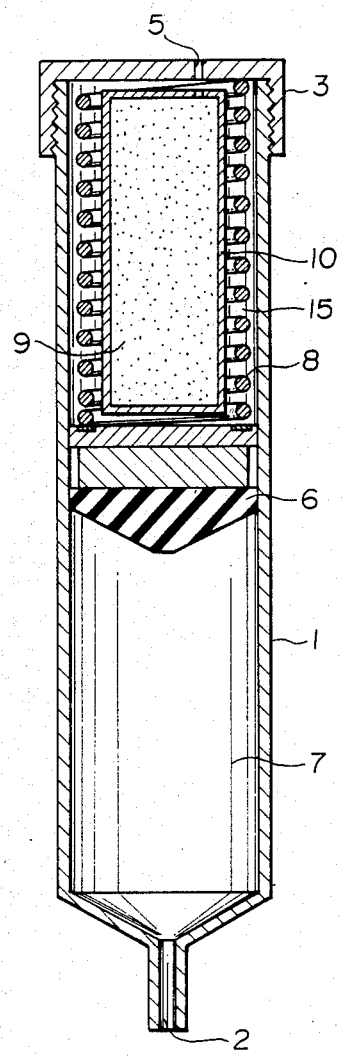
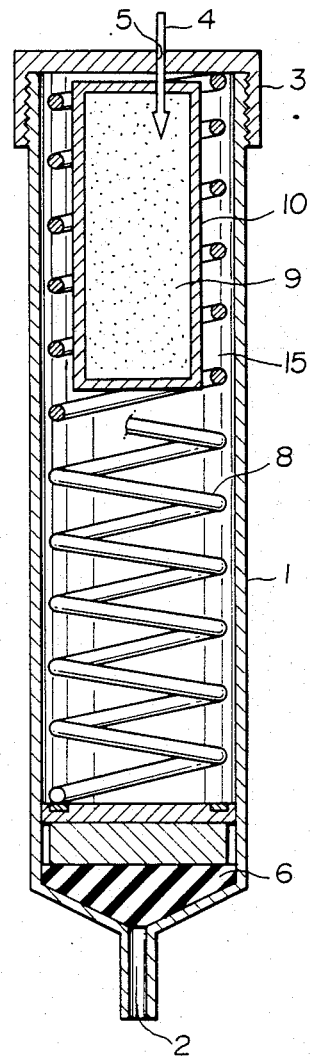

FIG. 5 FIG. 6
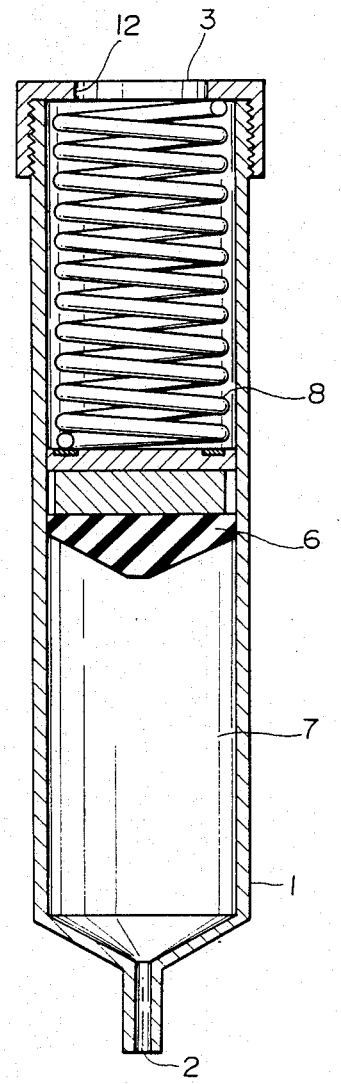
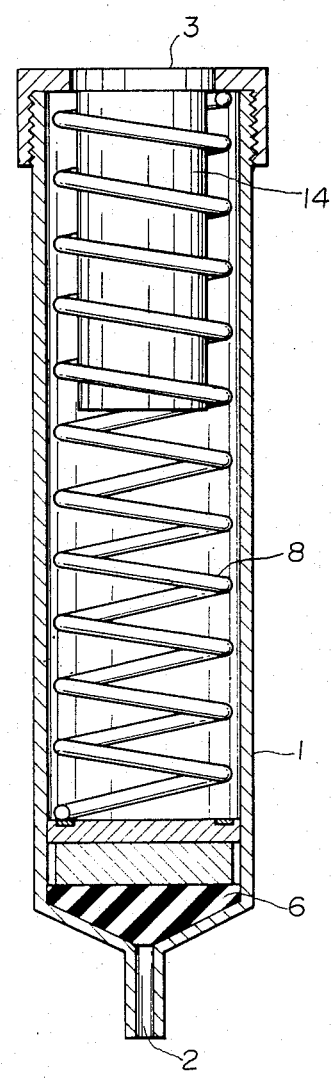

SEALANT INJECTOR

BACKGROUND OF THE INVENTION

1. Field of the Invention

The present invention relates to a sealant injector for use in the repair of cracks in a structure such as a concrete building or the like.

2. Prior Art

The development of cracks is generally inevitable for concrete structures or the like. Leaving the cracks unrepaired results in water leakage, or in the loss of the original purpose of the structure. Accordingly, it is necessary to repair the cracked part of the structure. However, professional techniques and expensive equipment have conventionally been required for the repair of the cracked part.

A small-size sealant injector is known, which is employed in, for example, a waterproof construction of concrete. In the small sealant injector, a steel coil spring normally having a compression force of the order of 1 to 30 kg is used to inject sealant into the crack on the concrete. For a large building or for large cracks, however, it may be necessary to prepare up to several hundreds of injectors. This poses a serious problem of time and labor required to set the coil springs of the sealant injectors.

That is, in the repair of cracks, the conventional sealant injector for filling sealant into crack is not satisfactory in operation. This makes the filling operation difficult and cumbersome.

SUMMARY OF THE INVENTION

It is therefore an object of the invention to provide a sealant injector for use in repair, which can improve its operation to facilitate the filling operation, thereby enabling a repair to be effected quickly.

For the above purpose, according to the invention, there is provided a sealant injector for use in repair, comprising:

an injector body having a forward end formed with a sealant nozzle;

piston mean fitted in the injector body for sliding movement relative thereto, the piston means cooperating with the forward end of the injector body to define therebetween a sealant chamber capable of being filled with sealant;

coil spring means arranged within the injector body, the coil spring means being provided with such a shape memory effect that when heated, the coil spring means biases the piston means toward the forward end of the injector body to inject the sealant within the sealant chamber through the sealant nozzle; and heating means adapted to be associated with the injector body, for heating the coil spring means.

As described above, the arrangement of the sealant injector according to the invention is such that the coil spring means provided with the two way shape memory effect is heated by the heating means to displace the piston means toward the forward end of the injector body, thereby injecting the sealant within the injector body, into a part to be repaired, through the sealant nozzle. With such an arrangement, the operation of the repair operation is improved considerably so that an operator can be freed from the setting operation of the coil spring means which has conventionally required considerable labor and skill. This makes it possible to carry out the repair quickly and reliably.

Various shape-memory alloys of different compositions may be used for the coil spring means, but well-known Cu-Zn-Al alloy or Ni-Ti alloy can preferably be used. One way or two way shape memory effect is known, and either effect can be imparted to the alloy by changing the composition and manufacturing conditions. In the present invention, one way shape memory alloy may be used since the coil spring means, which is in a contracted state when received in the injector body, is only required to be expanded when heated. However, if the coil spring means is made of a two way shape memory alloy, it can be repeatedly used, so that the cost in repair can be reduced. Therefore, the coil spring means should be preferably made of a two way shape memory alloy.

Preferably, the heating means may be comprised of rapid exothermic means which makes use of heat of chemical reaction. It may be arranged within or on the outside of the coil spring means. With this arrangement, even at a relatively low-temperature location such as the underground portion of a building or the like, the two way shape-memory coil spring means can fulfill its function effectively; the coil spring means can displace the piston means a predetermined distance for a predetermined period of time, making it possible to ensure the injection of a predetermined amount of sealant into the crack.

BRIEF DESCRIPTION OF THE DRAWINGS

FIG. 1 is a cross-sectional view of a sealant injector according to an embodiment of the invention, showing a coil spring having a shape memory effect in a contracted state;

FIG. 2 is a view similar to FIG. 1, but showing that the coil spring illustrated in FIG. 1 is in an expanded state;

FIG. 5 is a view similar to FIG. 1, but showing a sealant injector according to a further embodiment of the invention; and FIG. 6 is a view similar to FIG. 5, but showing that the coil spring illustrated in FIG. 5 is in an expanded state.

DESCRIPTION OF THE PREFERRED EMBODIMENTS OF THE INVENTION

Figure 3:
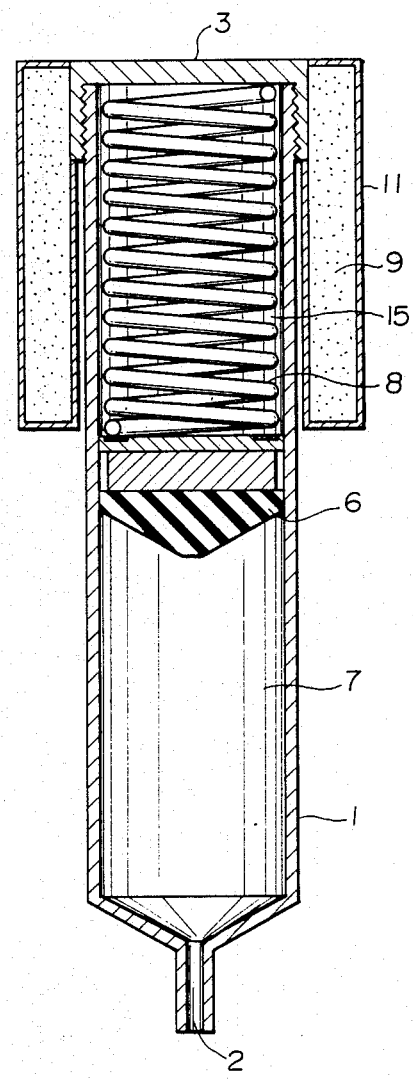
FIG. 3 is a view similar to FIG. 1, but showing a sealant injector according to another embodiment of the invention.

Referring first to FIGS. 1 and 2, there is shown a sealant injector for use in repair, according to an embodiment of the invention. The sealant injector comprises a cylindrical injector body 1 made of plastic or metal. The injector body 1 has a forward end which is reduced in diameter to form a sealant outlet or nozzle 2. The injector body 1 has a rearward open end which is closed by a cap 3 made of plastic or metal. The cap 3 is threadedly engaged with the rearward end of the injector body 1. The cap 3 is formed with a through bore 5 through which an exothermic actuator pin 4 can pass.

A piston 6 made of rubber is arranged within the injector body 1 for sliding movement therealong and relative thereto. The piston 6 cooperates with the forward end of the injector body 1 to define therebetween a sealant chamber 7 capable of being filled with sealant. The piston 6 cooperates with the rearward end of the injector body 1 to define therebetween an accommodating chamber 15.

A coil spring 8 is accommodated in the accommodating chamber 15 in concentric relation to the injector body The coil spring 8 is made of a two way shape memory alloy, and has such a shape memory effect that the coil spring 8 is in a contracted state illustrated in FIG. 1 under a temperature lower than a setting value, while the coil spring 8 is expanded, as illustrated in FIG. 2, under a temperature equal to or higher than the setting value. A two way shape memory Cu-Zn-Al alloy having a composition of Cu-6Al-20Zn-0.3Fe-0.1Ti may be preferably used.

A cylindrical capsule 10 filled with chemical-reaction exothermic material 9 is arranged within the coil spring 8 in concentric relation thereto. The chemical-reaction exothermic material 9 serves as rapid exothermic means and consists of, for example, calcium oxide (CaO) and water ($H_2O$). In such a case, water is contained in a bag so that it does not react calcium oxide. When the exothermic actuator pin 4 passes through the bore 5 in the cap 3 and pierces a wall of the capsule 10 so that the actuator pin 4 is inserted into the bag in the capsule 10, calcium oxide and water react with each other to produce hydrated lime ($Ca(OH)_2$) to generate heat of reaction. The chemical-reaction exothermic material 9 utilizes the heat of reaction.

A cracked part of a structure is repaired by the use of the sealant injector constructed as above in the following manner. That is, in a state illustrated in FIG. 1, the sealant chamber 7 of the injector body 1 is first filled with the sealant. For introducing the sealant into the chamber 7, the capsule 10, the coil spring 8 and the like are all removed, and after the completion of the filling, they are mounted again. Since, at this time, the chemical-reaction exothermic material 9 within the capsule 10 has not yet reacted, the temperature of the coil spring 8 is lower than its setting value so that the coil spring 8 is in the contracted state illustrated in FIG. 1. In this state, the sealant nozzle 2 of the injector body 1 is fixed to a repair nozzle put to the crack in the structure under repair. Subsequently, the exothermic actuator pin 4 pierces the wall of the capsule 10 and is inserted in the same, whereby the chemical-reaction exothermic material 9 is caused to react to generate heat. By this heat of reaction of the chemical-reaction exothermic material 9, the coil spring 8 is heated to a temperature equal to or higher than the setting value. As a result, the coil spring 8 is expanded, as illustrated in FIG. 2, to displace the piston 6 toward the sealant outlet 2 of the injector body 1. Thus, the sealant within the sealant chamber 7 is pushed out through the sealant outlet 2 and is injected reliably into the crack in the structure under repair.

Figure 4:
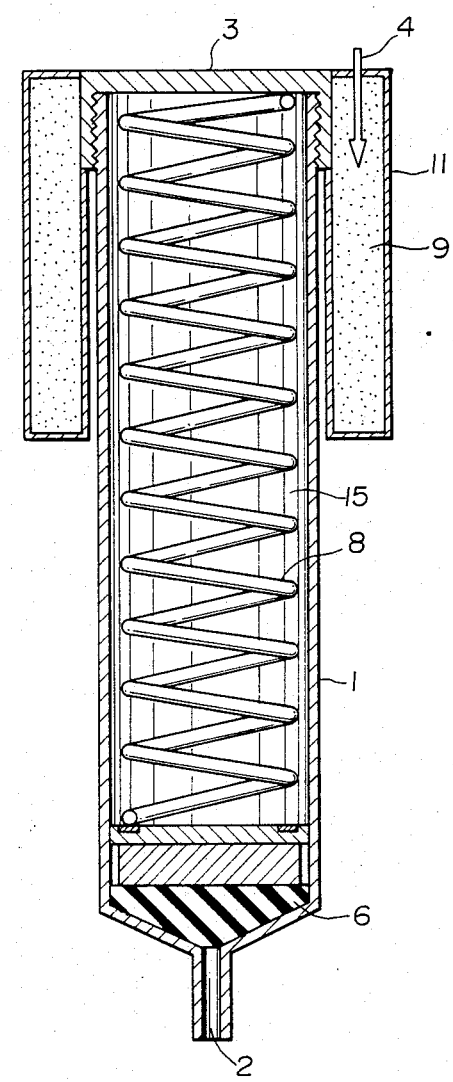
FIG. 4 is a view similar to FIG. 3, but showing that the coil spring illustrated in FIG. 3 is in an expanded state.

Referring to FIGS. 3 and 4, there is shown a sealant injector according to another embodiment of the invention. In FIGS. 3 and 4, components and parts like or similar to those illustrated in FIGS. 1 and 2 are designated by the same reference numerals.

The sealant injector illustrated in FIGS. 3 and 4 comprises a capsule 11 filled with the chemical-reaction exothermic material 9. The capsule 11 is tubular in shape and is arranged about the outer periphery of the injector body 1 in concentric relation thereto. The sealant injector can have advantages similar to those of the sealant injector illustrated in FIGS. 1 and 2. The sealant injector shown in FIGS. 3 and 4 has the following additional advantage. That is, a forward end of the tubular capsule 11 can extend toward the forward end of the injector body 1, whereby the coil spring 8 during expansion thereof or after expansion thereof can be sufficiently heated, up to its forward end, by the chemical-reaction exothermic material 9 in the capsule 11.

FIGS. 5 and 6 depict a sealant injector according to a further embodiment of the invention which differs from the first embodiment in that a cylindrical capsule or bag 14 containing chemical reaction exothermic material is used. The exothermic material is essentially comprised of iron powder, activated carbon, and wood powder into which salt water is infiltrated in order to facilitate oxidation. The material is wrapped in an air permeable inner wrapping paper or resin film and further in an airtight outer wrapping paper or resin film. Furthermore, the cap 3 is provided with an opening 12 for inserting the bag 14 into the injector body 1.

In this embodiment, sealant as well as the coil spring 8 in a contracted state is first introduced into the injector body 1, and then the injector body 1 is put to the crack in the structure under repair. Thereafter, the outer airtight packing is removed and the bag 14 is crumpled by hand so that the exothermic material sufficiently comes into contact with the air. Then, the bag 14 is inserted through the opening 12 into the injector body 1, and the coil spring 8 is expanded due to the heat of oxidation of iron powder. In this embodiment, it takes time until heat generates, but the heating can be effected for hours since the chemical reaction is mild.

Obviously many modifications and variations of the present invention are possible in the light of the above teachings. For example, an electric heater or other heating means may be utilized instead of the chemical-reaction exothermic material 9.

What is claimed is:

1. A portable sealant injector for use in repair of cracks in concrete structures, comprising:
   an injector body having a forward end formed with a sealant nozzle and having a rearward open end;
   a piston releasibly fitted in said injector body by sliding movement relative thereto, said piston cooperating with the forward end of said injector body to define therebetween a sealant chamber capable of being filled with sealant;
   a coil spring of a shape-memory alloy releasibly arranged within said injector body, for biasing said piston means toward the forward end of said injector body, when heated, to inject the sealant within said sealant chamber through said sealant nozzle;
   a heating unit releasibly associated with said injector body, for heating said coil spring; and
   a cap detachably mounted on said rearward open end of said injector body.

2. A sealant injector according to claim 1, wherein said coil spring is made of two way shape-memory alloy.

3. A sealant injector according to claim 2, wherein said heating unit is comprised of rapid exothermic unit including chemical-reaction exothermic material.

4. A sealant injector according to claim 3, wherein said rapid exothermic unit is arranged within said coil spring.

5. A sealant injector according to claim 4, wherein said rapid exothermic unit is cylindrical in shape and is arranged within said coil spring in concentric relation thereto.

6. A sealant injector according to claim 3, wherein said rapid exothermic unit is arranged on the outside of said coil spring.

7. A sealant injector according to claim 6, wherein said rapid exothermic unit is tubular in shape and is arranged about an outer periphery of said injector body in concentric relation thereto.

8. A sealant injector according to claim 3, wherein said rapid exothermic unit includes a capsule filled with said chemical-reaction exothermic material, and pin means for piercing a wall of said capsule, said chemical-reaction exothermic material reacting chemically in response to piercing of said pin means through the wall of said capsule, to generate heat of reaction for heating said coil spring. 01pe h 00

9. A sealant injector according to claim 3, wherein said rapid exothermic unit comprises an air permeable bag with said chemical-reaction exothermic materials contained therein, said exothermic material being a substance which generates heat by oxidation reaction.

10. A sealant injector according to claim 1, wherein said coil spring is composed of a single coil spring arranged within said injector body in concentric relation thereto and between said piston and a rearward end of said injector body, and wherein when said coil spring is heated by said heating unit, said coil spring is expanded to displace said piston toward the forward end of said injector body.

* * * * *